C. HANSON, OF OWATONNA, MINNESOTA.

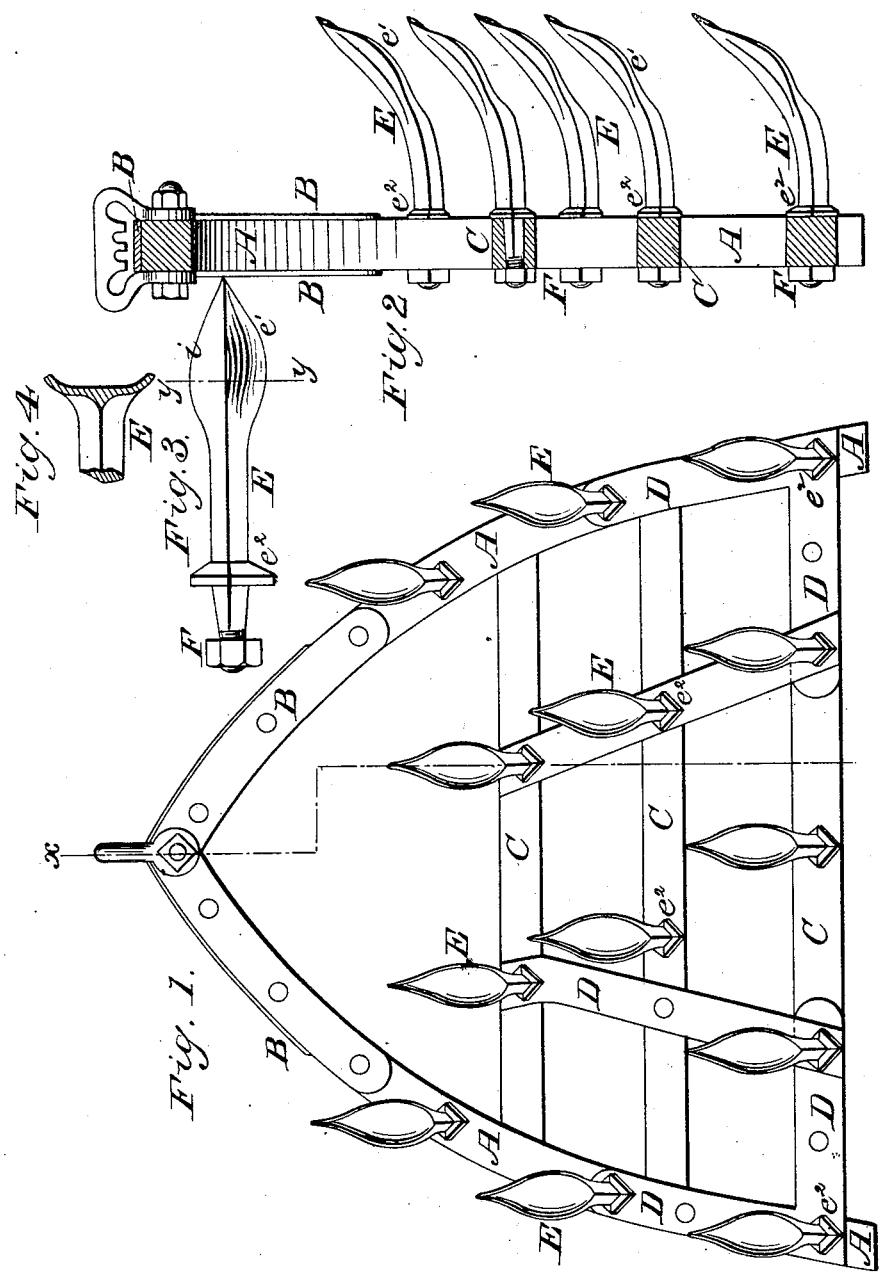

Letters Patent No. 84,547, dated December 1, 1868.

IMPROVEMENT IN HARROWS.

The Schedule referred to in these Letters Patent and making part of the same.

*To all whom it may concern:*

Be it known that I, C. HANSON, of Owatonna, in the county of Steele, and State of Minnesota, have invented a new and useful Improvement in Harrows; and I do hereby declare that the following is a full, clear, and exact description thereof, which will enable others skilled in the art to make and use the same, reference being had to the accompanying drawings, forming part of this specification, in which—

Figure 1 is an under-side view of my improved harrow.

Figure 2 is a detail sectional view of the same, taken through the line $x\ x$, fig. 1.

Figure 3 is a detail view of one of the teeth.

Figure 4 is a detail cross-section of the same, taken through the line $y\ y$, fig. 3.

Similar letters of reference indicate like parts.

My invention has for its object to furnish an improved harrow, simple and strong in construction, and effective in operation, doing its work more thoroughly than harrows constructed in the ordinary manner; and It consists in the construction and combination of the various parts, as hereinafter more fully described.

A are the side beams of the harrow-frame, which are made curved, as shown in fig. 1, and the forward ends of which are securely attached to each other, being secured in place by the metallic straps B, placed above, below, and upon the outer sides of the said forward ends.

The curved side bars A are connected to each other by three or more cross-bars C, to which, and to the curved side bars, the teeth are attached.

The side bars A and the cross-bars C are connected together and strengthened by the metallic straps D, securely bracing the various parts of the harrow-frame together, as shown in fig. 1.

E are the teeth of the harrow, the lower or working parts of which are inclined forward, and are widened out or made broader, as shown in the drawings, so as to form a concavity at their lower sides or bases, and also, so as to form depressions or grooves upon their upper sides, so that the said extended sides or wings, $e'$, may act somewhat as mould-boards in stirring up the ground.

Upon the upper ends of the shanks of the teeth E are formed shoulders or collars, $e^2$, which rest against the under side of the harrow-frame, as shown in fig. 2.

The upper ends of the shanks of the teeth E pass through the harrow-frame, and are secured in place by nuts F, screwed upon them, as shown in figs. 2 and 3.

The parts of the shanks of the teeth E that pass through the harrow-frame are made square, as are also the holes through which they pass, so that it may be impossible for the said teeth to turn in their places.

The teeth E should be so arranged that no two of them may work in the same path, and so that the paths of all the teeth may be parallel with and equally distant from each other.

It should also be observed, that as many as possible of the teeth E should pass through the brace-straps D, as giving a firmer support to said teeth.

Having thus described my invention,

I claim as new, and desire to secure by Letters Patent—

An improved harrow-frame, formed by the combination of the curved side bars A, brace-straps B, cross-bars C, teeth E, and brace-straps D, with each other, substantially as herein shown and described, and for the purpose set forth.

C. HANSON.

Witnesses:
H. H. JOHNSON,
G. F. ALBERTUS.